C. E. JOHANSSON.
CALIPER GAGE WITH AXIALLY ADJUSTABLE BOLTS.
APPLICATION FILED OCT. 29, 1913. RENEWED JULY 6, 1916.
1,200,947.
Patented Oct. 10, 1916.
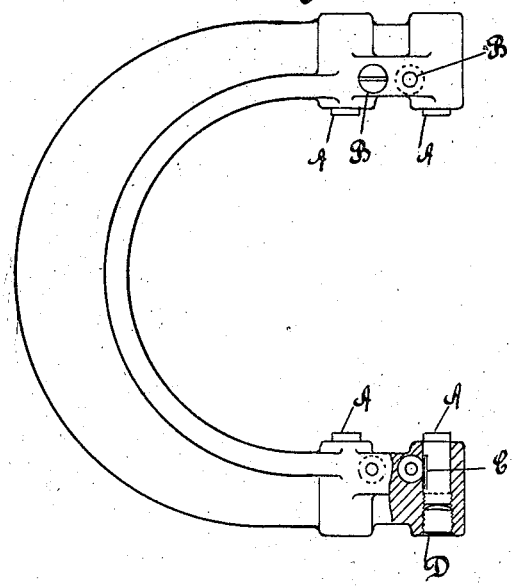
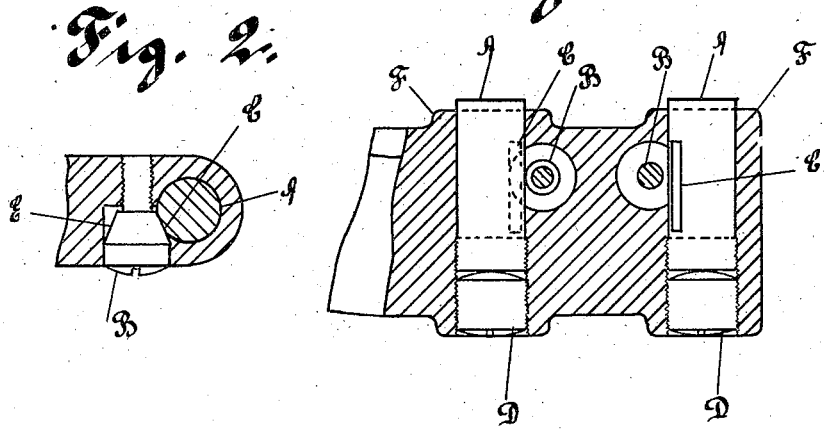

UNITED STATES PATENT OFFICE.

CARL EDWARD JOHANSSON, OF ESKILSTUNA, SWEDEN.

CALIPER-GAGE WITH AXIALLY-ADJUSTABLE BOLTS.

1,200,947.      Specification of Letters Patent.      Patented Oct. 10, 1916.

Application filed October 29, 1913, Serial No. 798,133. Renewed July 6, 1916. Serial No. 107,875.

*To all whom it may concern:*

Be it known that I, CARL EDWARD JOHANSSON, a subject of the King of Sweden, and resident of Eskilstuna, Sweden, have invented a certain new and useful Improvement in Caliper-Gages with Axially-Adjustable Bolts, of which the following is a specification.

Limit-gages for testing the dimensions of work-pieces are now extensively used in work shops and many of these are adjustable, the bolt of one shank being screw-threaded so as to allow the distance between the bolts to be regulated by screwing. In these gages the end-faces of the bolts, however, often assume an oblique position in relation to each other, as the said faces seldom are accurately at right angles to the axis of the bolts, and the bringing of the axis of one bolt to coincide with that of the other bolt requires much adjusting and cost of labor. Consequently the distance between the edges of the bolts often differs, and the measure obtained will not be exact.

This invention has for its object to remedy this inconvenience by arranging the bolts in such a manner, that they can only move axially.

The improved gage is shown in the annexed drawing in which—

Figure 1 is a lateral view of the gage, while Figs. 2 and 3 are details.

The bolts A, A are exactly adjusted in openings in their barrels or sockets F, F, and the outer portions of these openings are screw threaded for the reception of regulating-screws D, D, the inner ends of which rest against the outer ends of the bolts. In order to prevent the bolts from turning in their sockets, the bolts are provided with guides of any known description. Preferably this guide consists of a pressing-screw B acting at an angle to the bolt and having a conical portion E resting against a lateral face C of the bolt, the said face being parallel to the axis of the latter.

The bolts are adjusted in the following manner: After the screw B has been loosened in order to bring the conical piece E out of contact with the face C the bolt is adjusted by means of the screw D, whereupon the screw B is tightened. Even if the bolt should be subjected to a considerable strain in measuring, it will retain its position under the pressure of the two screws D and B. The sockets F are proportioned so as to protect the threads of the screws D from outside damage. The screw D is placed in such a position relatively to the bolt, that this latter is pressed against the screw D, when the conical piece E presses against the face C on tightening the screw B, and thus the bolt is secured in position. The conical piece E may consist of a washer of a conical section concentric with the screw B.

Having now described my invention, what I claim as new and desire to secure by Letters Patent is:

In a limit gage the combination of an axially movable bolt having a lateral plane face, with a socket or barrel provided with an opening for the reception of said bolt, screw threads in the outer portion of said opening, a regulating screw in said opening resting with its inner end against the outer end of said bolt, and a pressure screw laterally disposed in said socket and having a conical portion adapted to rest against the lateral plane face of said bolt for holding the same in position, and for preventing the bolt from turning in its socket substantially as described.

In witness whereof I have hereunto set my hand in the presence of two witnesses.

CARL EDWARD JOHANSSON.

Witnesses:
  CARL FRANC,
  JACOB BAGGE.